United States Patent
Sato

[11] Patent Number: 6,062,693
[45] Date of Patent: May 16, 2000

[54] THREE-DIMENSIONAL IMAGE PROJECTING DEVICE

[75] Inventor: Shunichi Sato, Chiba, Japan

[73] Assignee: Sharp Kabushiki Kaisha, Osaka, Japan

[21] Appl. No.: 08/859,563

[22] Filed: May 20, 1997

[30] Foreign Application Priority Data

Jul. 25, 1996 [JP] Japan .................................. 8-196598

[51] Int. Cl.⁷ .................................................. G03B 21/14
[52] U.S. Cl. .............................. 353/7; 359/471; 359/479; 359/23; 353/10
[58] Field of Search .................................. 353/7, 10, 46, 353/94, 98; 359/14, 23, 10, 19, 20, 471, 472, 478, 479; 348/54, 40

[56] References Cited

U.S. PATENT DOCUMENTS

| | | | |
|---|---|---|---|
| 1,698,221 | 1/1929 | Craig | 353/7 |
| 4,571,041 | 2/1986 | Gaudyn | 353/7 |
| 4,623,223 | 11/1986 | Kempf | 359/472 |
| 4,756,601 | 7/1988 | Schroder | 359/472 |
| 4,778,262 | 10/1988 | Haines | 359/23 |
| 4,840,455 | 6/1989 | Kempf | 359/471 |
| 5,191,449 | 3/1993 | Newswanger | 353/7 |
| 5,825,540 | 10/1998 | Gold et al. | 353/7 |

OTHER PUBLICATIONS

"Three–Dimensional Display Device", Japanese Laid–Open Patent Publication No. 5–107504, Published on Apr. 30, 1993.

V.G. Komar, "Progress on the Holographic Movie Process in the USSR", SPIE, vol. 120, Three–Dimensional Imaging (1997).

*Primary Examiner*—William Dowling
*Attorney, Agent, or Firm*—David G. Conlin; William J. Daley, Jr.

[57] ABSTRACT

The invention is intended to provide a three-dimensional image projecting device which is capable of presenting a three-dimensional image observable in a wide visual field without tiring eyes of an observer. A three-dimensional image displayed by three-dimensional image displaying means is projected by a reflection type projecting hologram lens and reflection type hologram acting as optical transferring means and a reflection type hologram lens to produce respective three-dimensional images. These three-dimensional images are formed at the same magnification in the same space to form a continuous image area. For this purpose, reflection type hologram lenses are disposed on the periphery of a circle. Respective three-dimensional images is reflected by the reflection type hologram acting as the optical transferring means, thus an enlarged three-dimensional image can be seen over the respective visual fields.

8 Claims, 6 Drawing Sheets

THREE-DIMENSIONAL IMAGE PROJECTING DEVICE

BACKGROUND OF THE INVENTION

Prior arts three-dimensional image projecting devices are disclosed in Japanese Laid-Open Patent Publication (TOKKAIHEI) No. 5-107504 and paper "PROGRESS ON THE HOLOGRAPHIC MOVIE PROCESS IN THE USSR", Three-dimensional Imaging (1977), SPIE Vol.120, respectively.

The three-dimensional image projecting device described in Japanese Laid-Open Patent Publication No. 5-107504 is so constructed that images with parallax from different directions are displayed on a plurality of liquid-crystal displays (LCD) arranged horizontally and the displayed images are projected on a retro-reflecting screen through a projection lens, Fresnel lens and convex mirror. The retro-reflecting screen is composed of a lenticular lens and diffusion reflecting surface. An observer can view a three-dimensional image by the effect of the parallax of the images. However, a three-dimensional image to be produced by the three-dimensional image projecting device is a stereogram using only the effect of parallax between the left and right eyes of the observer.

The three-dimensional image projecting device described in the paper "PROGRESS ON THE HOLOGRAPHIC MOVIE PROCESS IN THE USSR", Three-dimensional Imaging (1977), SPIE Vol. 120 is so constructed that a hologram image reproduced from hologram is projected onto a screen through a projection lens. The screen is multiplexed hologram of a concave mirror whereby a three-dimensional image is formed as three-dimensional images. The screen is a hologram of a multi-recorded concave mirror, which are observable by the same number of observers as the number of the multiplexed records. The device uses a double-recorded hologram of the concave mirror. Accordingly, an observer can view a three-dimensional image through an observing window while another observer can view a three-dimensional image through another observing window. The three-dimensional images observable by the observers are identical to each other.

However, the former of the above-mentioned prior arts is based on stereoscopic vision of a stereogram by using a parallax and lacks in adjusting function of another stereoscopic viewing mechanism. Accordingly, it may tire the eyes of the observer so much not to enjoy the video stereoscopic vision for a long time.

The latter prior art device provides a real image of an object observable by using all stereoscopic viewing mechanisms that may not tire the eyes of the observer. However, its viewing window (i.e., field of vision) is narrow and restricts the field of observing the three-dimensional image. To widen the visual field of this device, it is necessary to use projection lenses of a large diameter which is, however, expensive.

SUMMARY OF THE INVENTION

The present invention relates to a three-dimensional image projecting device and more particularly to a three-dimensional image projecting device capable of projecting an enlarged three-dimensional image to be observable in a wide visual field.

The present invention was made to provide a three-dimensional image projecting device which is capable of representing a three-dimensional image in a wide field of vision without tiring the eyes of an observer when viewing the stereo-video for a long time.

(1) A three-dimensional image projecting device according to the present invention comprises light-generating means for generating light participating in forming an optical image of three-dimensional object, optical projecting means for projecting an optical image formed by light generated by the light-generating means and optical transferring means for directing an optical image acting on the optical projecting means to respective visual fields, wherein the optical projecting means is composed of a plurality of reflection type projecting lenses and respective three-dimensional optical images projected by the plurality of reflection type projecting lenses are formed at the same magnification in the same place so that the respective image-forming areas are continued to each other. Thus, the three-dimensional image can be observed from a wide field of vision through a plurality of reflection type projection lenses and the optical transferring means.

(2) Another three-dimensional image projecting device according to the present invention which is constructed as mentioned above (1), is characterized in that the light-generating means is provided with an object and illuminating means for illuminating the object. This enables observation of an actual existing object.

(3) Another three-dimensional image projecting device according to the present invention which is constructed as mentioned above (1), is characterized in that the light-generating means is three-dimensional image display means, whereby a three-dimensional image reproduced from input image data is presented.

(4) Another three-dimensional image projecting device according to the present invention which is constructed as mentioned above (3), is characterized in that the three-dimensional image display means is provided with holograms prepared for reproducing the three-dimensional image. This enables miniaturization of the light-generating means for forming the three-dimensional image.

(5) Another three-dimensional image projecting device according to the present invention which is constructed as mentioned above (3), is further characterized in that the three-dimensional image display means is a device that sequentially displays a plurality of sectional images composing a three-dimensional image with shifting two-dimensional image display means. This enables observation of an image reproduced by data representing two-dimensional sectional images.

(6) Another three-dimensional image projecting device according to the present invention which is constructed as mentioned above any one of (1) to (5), is further characterized in that at least one of the plurality of reflection type projecting lenses is a diffraction type optical element such as a hologram. This enables miniaturization of the device as well as close arrangement of a large number of the elements.

(7) Another three-dimensional image projecting device according to the present invention which is constructed as mentioned above any one of (1) to (6), is further characterized in that the optical transferring means is a concave mirror. This feature enables obtaining a high-quality three-dimensional image with no wavelength dependency and with a reduced aberration. The use of the reflection type projecting lens and optical transferring means can make the device be of compact construction.

(8) Another three-dimensional image projecting device according to the present invention which is constructed as mentioned above any one of (1) to (6), is further characterized in that the optical transferring means is a diffraction type optical element such as a hologram. This feature can further reduce the size of the device.

PREFERRED EMBODIMENT OF THE INVENTION

Prior to explaining preferred embodiment of the present invention, prior art three-dimensional image projecting devices will be described below as references for the present invention.

Prior arts three-dimensional image projecting devices are disclosed in Japanese Laid-Open Patent Publication (TOKKAIHEI) No. 5-107504 and paper "PROGRESS ON THE HOLOGRAPHIC MOVIE PROCESS IN THE USSR", Three-dimensional Imaging (1977), SPIE Vol.120, respectively.

Figure 1:
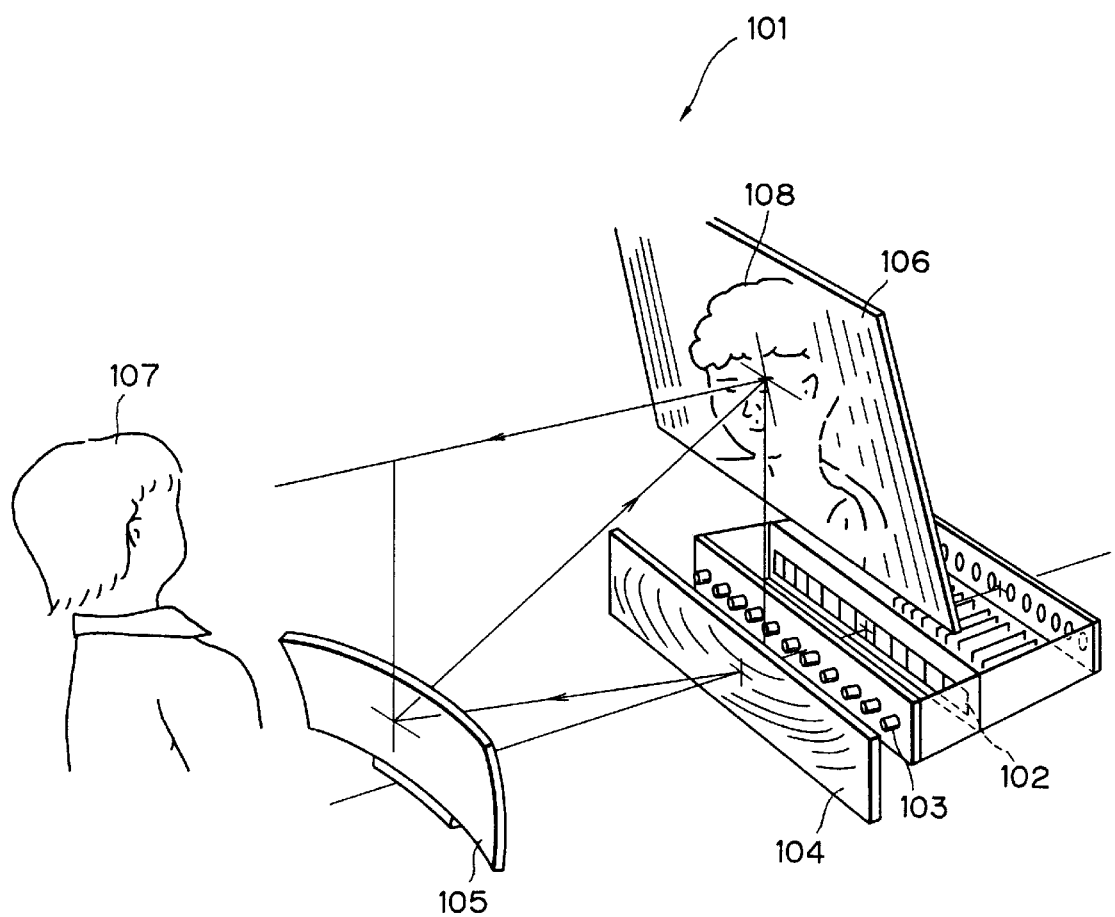
FIG. 1 is a schematic construction view of a conventional three-dimensional image projecting device using a recursively reflecting screen.

FIG. 1 is a schematic construction view of the three-dimensional image projecting device 101 described in Japanese Laid-Open Patent Publication No. 5-107504. As shown in FIG. 1, this three-dimensional image projecting device 101 is so constructed that images with parallax from different directions are displayed on a plurality of liquid-crystal displays (LCD) 102 arranged horizontally and the displayed images are projected on a retro-reflecting screen 106 through a projection lens 103, Fresnel lens 104 and convex mirror 105. The retro-reflecting screen 106 is composed of a lenticular lens and diffusion reflecting surface. An observer 107 can view a three-dimensional image 108 by the effect of the parallax of the images. However, a three-dimensional image 108 to be produced by the three-dimensional image projecting device 101 is a stereogram using only the effect of parallax between the left and right eyes of the observer 107.

Figure 2:
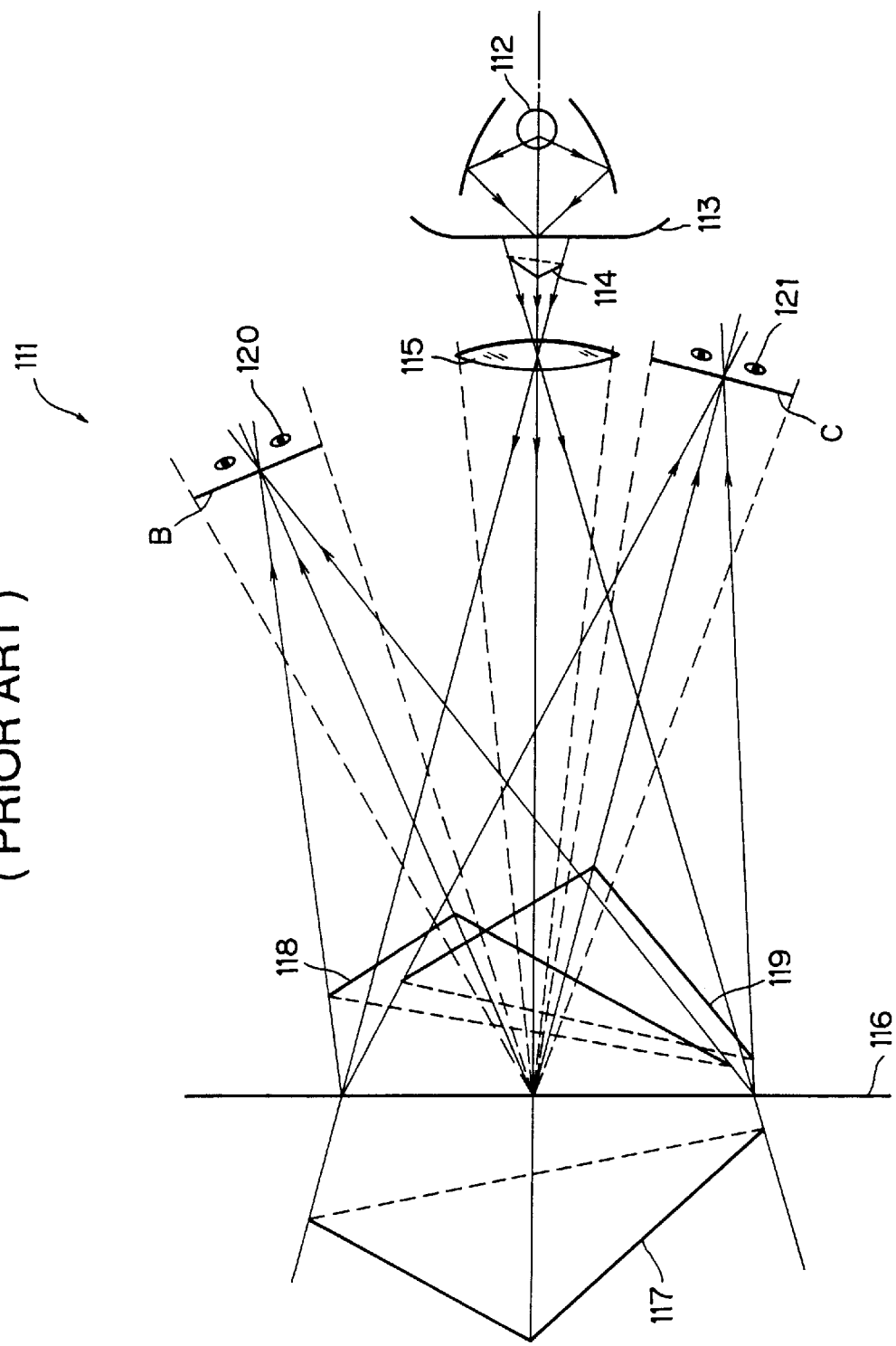
FIG. 2 is a schematic construction view of a conventional three-dimensional image projecting device using a concave mirror hologram.

FIG. 2 is a schematic construction view of the three-dimensional image projecting device 111 described in the paper "PROGRESS ON THE HOLOGRAPHIC MOVIE PROCESS IN THE USSR", Three-dimensional Imaging (1977), SPIE Vol. 120. As shown in FIG. 2, this three-dimensional image projecting device is so constructed that a hologram image 114 reproduced from hologram 113 is projected onto a screen 116 through a projection lens 115. The screen 116 is multiplexed hologram of a concave mirror whereby a three-dimensional image 117 is formed as three-dimensional images 118 and 119. The screen 116 is a hologram of a multi-recorded concave mirror, which are observable by the same number of observers as the number of the multiplexed records. The device shown in FIG. 2 uses a double-recorded hologram of the concave mirror. Accordingly, an observer 120 can view a three-dimensional image 118 through an observing window B while another observer 121 can view a three-dimensional image 119 through an observing window C. The three-dimensional images observable by the observers 120 and 121 are identical to each other.

However, the former of the above-mentioned prior arts is based on stereoscopic vision of a stereogram by using a parallax and lacks in adjusting function of another stereoscopic viewing mechanism. Accordingly, it may tire the eyes of the observer so much not to enjoy the video stereoscopic vision for a long time.

The latter prior art device provides a real image of an object observable by using all stereoscopic viewing mechanisms that may not tire the eyes of the observer. However, its viewing window (i.e., field of vision) is narrow and restricts the field of observing the three-dimensional image. To widen the visual field of this device, it is necessary to use projection lenses of a large diameter which is, however, expensive.

Referring now to the accompanying drawings, the preferred embodiments of the present invention will be described below in detail.

First Embodiment

Figure 3A:
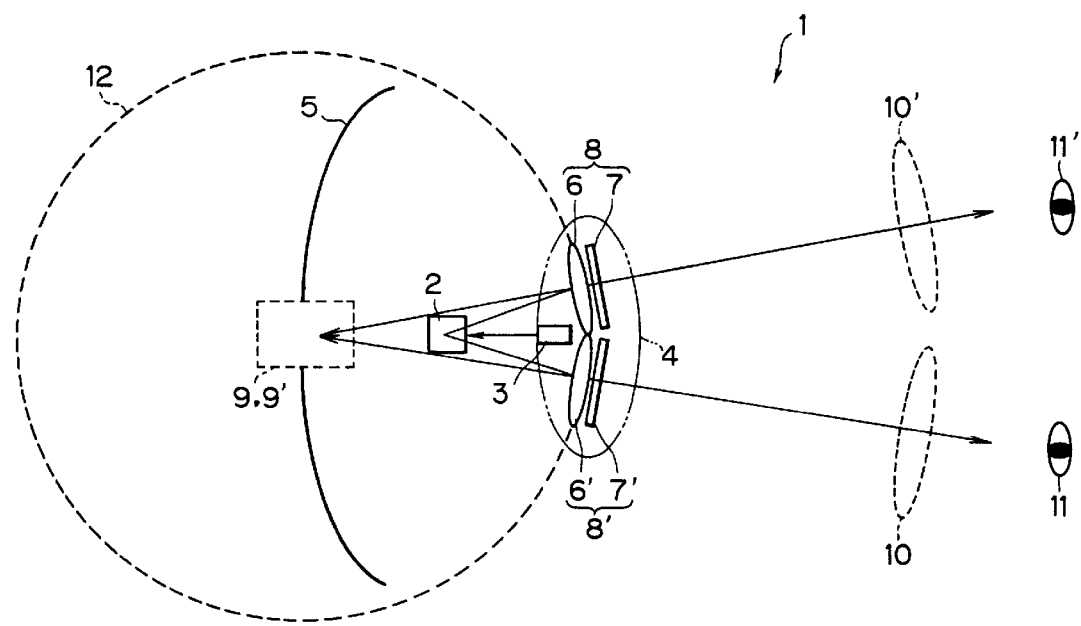
FIG. 3A schematically illustrates a top view of a three-dimensional image projecting device which is a first embodiment of the present invention.
Figure 3B:
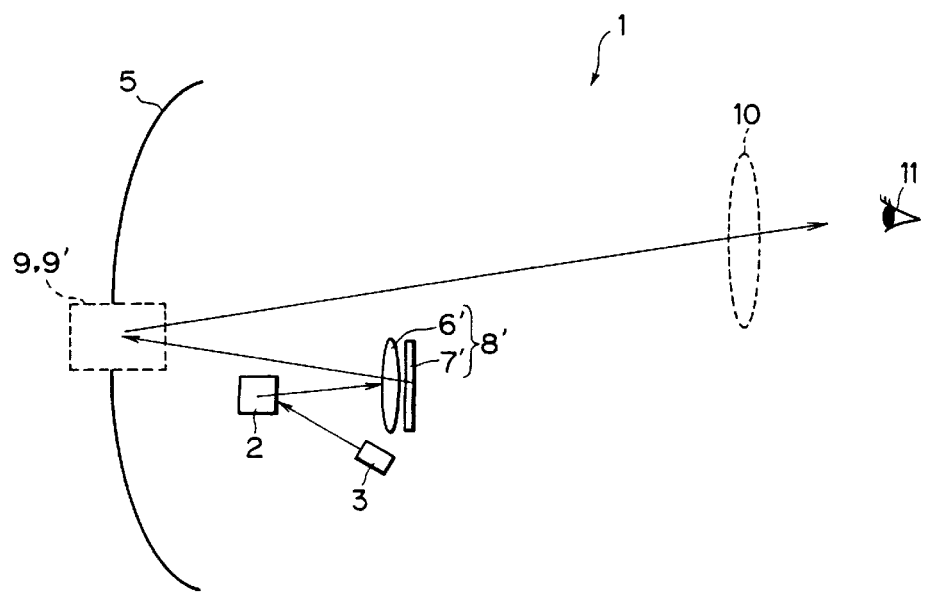
FIG. 3B schematically illustrates a side view of a three-dimensional image projecting device which is a first embodiment of the present invention.

FIGS. 3A and 3B are top view and a side view, respectively, of a mimically illustrated three-dimensional image projecting device which is a first embodiment of the present invention. In FIGS. 3A and 3B, the three-dimensional image projecting device 1 is mainly composed of an object 2, a light-source 3 for illuminating the object 2, an optical projecting system 4 for projecting an image of the object into a specified space, optical transferring means 5 disposed in the vicinity of the specified space into which the object image falls (the optical transferring means may be also called as a screen, e.g., the screen 116 in FIG. 2 shown as a prior art: SPIE Vol. 120).

The object used is a plastic ornament. An optical projecting system 4 is composed of a pair of reflection type projection lenses 8 (8'), each of which is a combination of a mirror 7 (7') with a projection lens 6 (6') having a focal length of 40 cm at the object side, which is specially used for a LCD. The optical transferring means 5 is a concave mirror having a diameter of 40 cm with a focal length of 55 cm.

The operation of the device is as follows:

An image of the object 2 is projected from the reflection type projecting lens 8 into a space near the optical transferring means 5 whereby a three-dimensional image 9 is produced thereabout. The reflection type projecting lens 8' produces in like manner a three-dimensional image 9' near the optical transferring means 5. Namely, the three-dimensional images 9 and 9' are formed by the action of the reflection type projecting lenses 8 and 8' with the optical transferring means 5.

Respective three-dimensional images 9 and 9' are formed at the same magnification in the substantially same place near the optical transferring means 5. Accordingly, the reflection type projecting lenses 8 and 8' are disposed on the periphery of a circle 12 whose center is a center of the three-dimensional image 9 and 9'.

Respective three-dimensional images 9 and 9' are reflected by the optical transferring means 5 so that they can be seen from the visual fields 10 and 10'.

The image formed by the reflection type projecting lens 8 can be observed in the visual field 10 while the image formed by the reflection type projecting lens 8' can be observed in the visual field 10'.

The visual fields 10 and 10' are of images formed by the optical transferring means 5 (a convex mirror) with the reflection type projecting lenses 8 and 8' respectively. When an observer places own eyes 11 and 11' in the visual fields 10 and 10' respectively, he or she can observe an enlarged three-dimensional image as be continuous over the visual fields 10 and 10'.

In the first embodiment, the light source 3 may be either white-light source (incoherent light source) or laser light source (coherent light source).

The positions whereat the three-dimensional images 9 and 9' are formed are not limited to the place near the optical transferring means 5. An advantage of forming the three-dimensional images 9 and 9' near the optical transferring means 5 is that wide visual fields can be obtained irrespective of a size of the optical transferring means 5. However, it is possible to obtain a wide visual field by producing the three-dimensional images 9 and 9' in a plane apart from the optical transferring means 5 if the latter has a large size.

Second Embodiment

Figure 4A:
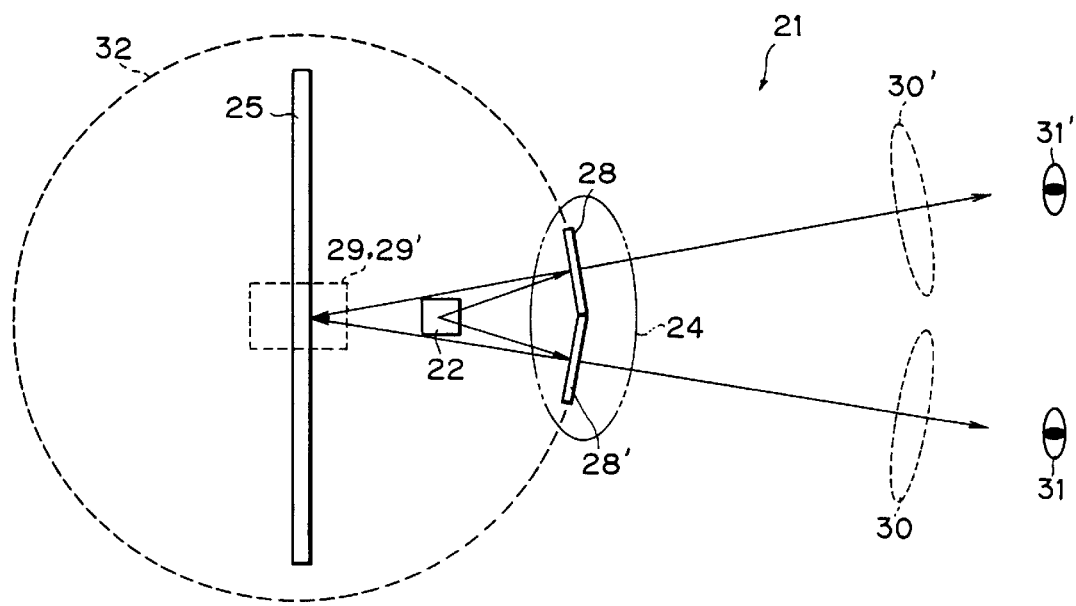
FIG. 4A schematically illustrates a top view of a three-dimensional image projecting device which is a second embodiment of the present invention.
Figure 4B:
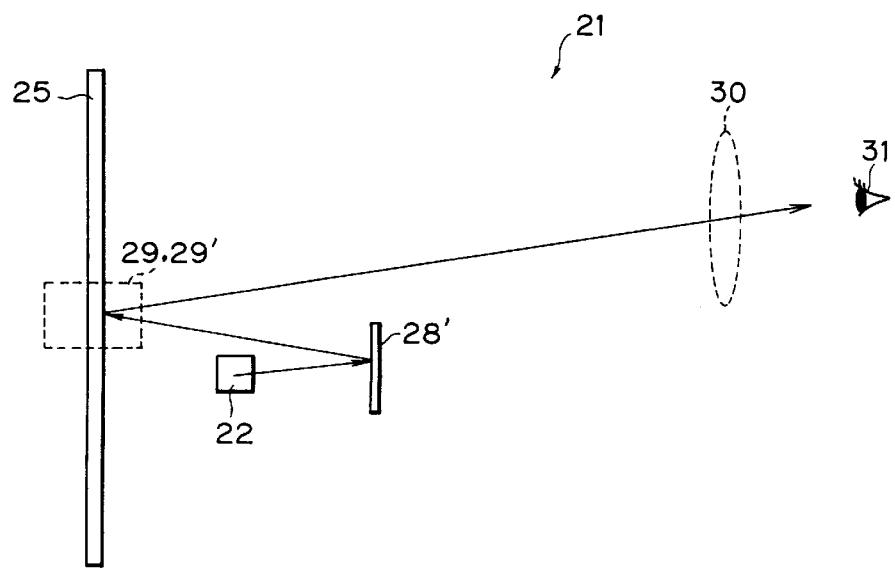
FIG. 4B schematically illustrates a side view of a three-dimensional image projecting device which is a second embodiment of the present invention.

FIGS. 4A and 4B are top view and a side view, respectively, of a mimically illustrated three-dimensional image projecting device which is a second embodiment of the present invention.

In FIGS. 4A and 4B, the three-dimensional image projecting device 21 is mainly composed of a three-dimensional image display means (not shown) for displaying a three-dimensional image 22, an optical projecting system 24 for projecting the three-dimensional image 22 displayed by the three-dimensional image display means into a different specified space, a reflection type hologram 25 used as optical transferring means disposed near the specified space for reproducing the three-dimensional image 22.

In this case, the three-dimensional display means is a volumetric scanning type three-dimensional image display (to be described later). The optical projecting system 24 is composed of reflection type hologram lenses 28 and 28' which are prepared by a hologram having the same function as the reflection type projecting lenses 8 and 8' used in the first embodiment have. The reflection type hologram 25 functioning as optical transferring means is prepared by a hologram having the same function as the concave mirror used in the first embodiment have.

The operation of the device is as follows:

A three-dimensional image 22 displayed on the three-dimensional image display means is projected from the reflection type projecting hologram lens 28 and it is further transferred by the reflection type hologram (optical transferring means) 25 to form a three-dimensional image 29 near the reflection type hologram 25. The reflection type projecting hologram lens 28' produces in like manner a three-dimensional image 29' near the reflection type hologram (optical transferring means) 25.

The respective three-dimensional images 29 and 29' are formed at the same magnification in the substantially same place near the reflecting type hologram (optical transferring means) 25. Accordingly, the reflection type projecting hologram lenses 28 and 28' are disposed on the periphery of a circle 32 whose center corresponds to the center of three-dimensional images 29 and 29'.

The respective three-dimensional images 29 and 29' are reflected by the reflection type hologram 25 acting as optical transferring optical means so that they can be seen in the visual fields 30 and 30'. The image formed by the reflection type projecting hologram lens 28 can be observed in the visual field 30 while the image formed by the reflection type projecting hologram lens 28' can be observed in the visual field 30'.

The visual fields 30 and 30' are of images formed by the optical transferring means 25 (a convex mirror) with the reflection type projecting lenses 28 and 28' respectively. When an observer places own eyes 31 and 31' in the visual fields 30 and 30' respectively, he or she can observe an enlarged three-dimensional image as be continuous over the visual fields 30 and 30'.

In the second embodiment, the reflection type projecting hologram lenses 28 and 28' are flat and can be disposed close to each other with no gap therebetween. This makes it possible to easily join respective-image forming areas of the reflection type projecting hologram lenses 28 and 28' to provide a continuous visual field (i.e., visual fields 30 and 30' adjoining to each other or with a partial overlap). This feature is particularly advantageous for optical projecting systems each composed of three or more pieces of lenses.

Figure 5:
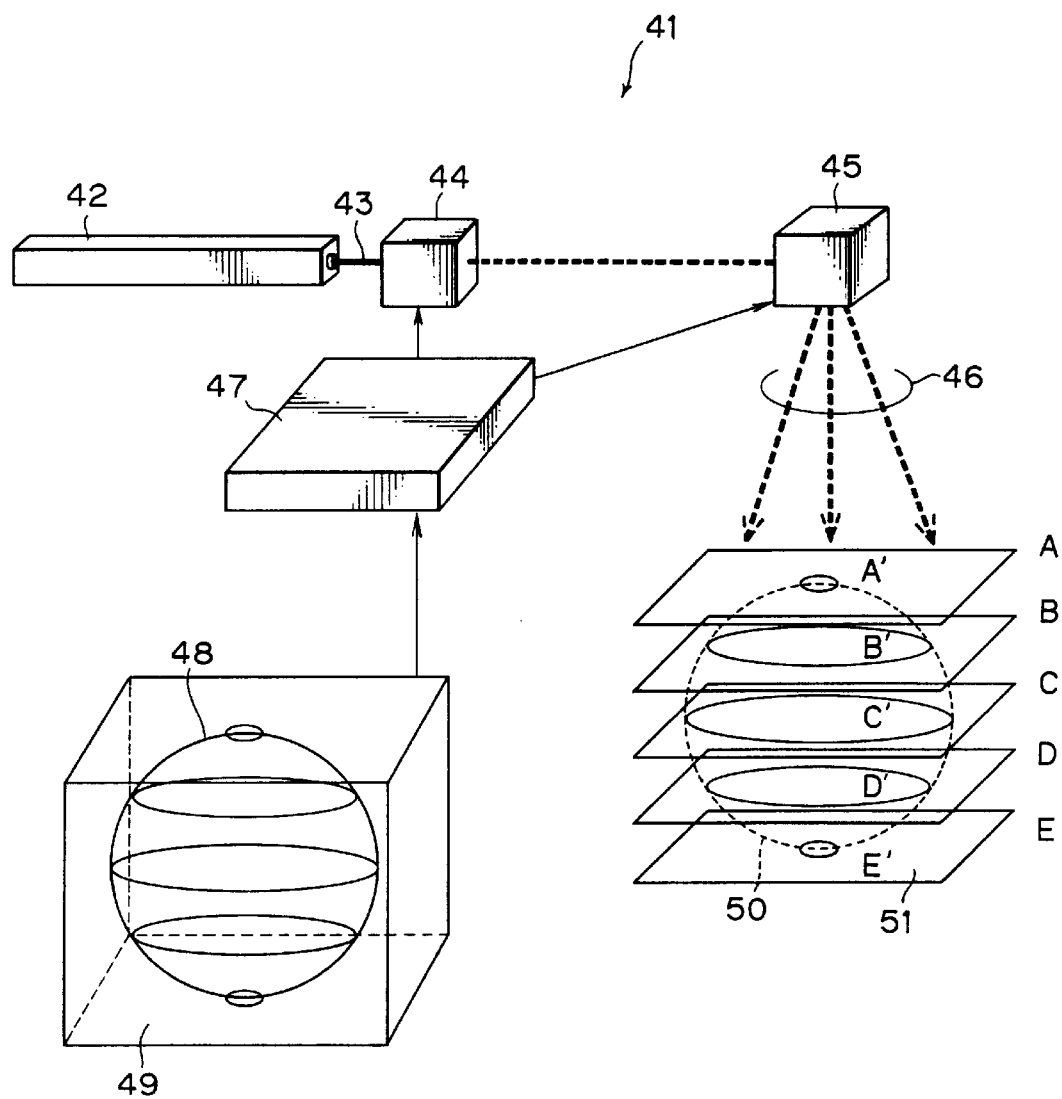
FIG. 5 is a schematic view of a three-dimensional image display used in the three-dimensional image projecting device according to the second embodiment of the present invention.

The three-dimensional display 41 for displaying a three-dimensional image on its screen will be described below:

FIG. 5 is a schematic mimic view of a three-dimensional image display 41. By way of an example and to make the description more simple, this display is supposed to reproduce 5 sectional images. The three-dimensional image display 41 is composed mainly of a laser light source 42, a modulator 44, X–Y deflector 45, a control computer 47, an image data memory 49, a moving flat screen 51.

The operation of the display is as follows:

Data 48 for a three-dimensional image desired to be displayed (a spherical body in the shown case) is first prepared. As shown in FIG. 5, the moving flat screen 51 moves at a constant speed from position A to position E and instantly returns to the position A, then it repeats the above-mentioned reciprocal movement. While the moving flat screen 51 moves, three-dimensional sectional images A' to E' corresponding to respective positions A to E of the moving flat screen 51 are formed in turn. This is realized by the control computer 47 that in this case performs sequential raster scan of the screen with laser light 46 by controlling the modulator 44 and the X–Y deflector 45. At this time, one can see a three-dimensional image 50 by the effect of afterimage in a space defined by [the screen area]×[the moving stroke] of the screen 51 on the condition that the moving speed of the moving flat screen 51 and the scanning speed of the laser light 46 are sufficiently high and synchronized with each other.

A method for preparing a reflection type hologram 25 composing the transferring optical means used in the three-dimensional image display 21 (FIGS. 4A and 4B) is as follows:

The reflection type hologram 25 that works as the optical transferring means is prepared as a hologram of concave mirror used as the transferring means in the first embodiment.

Figure 6:
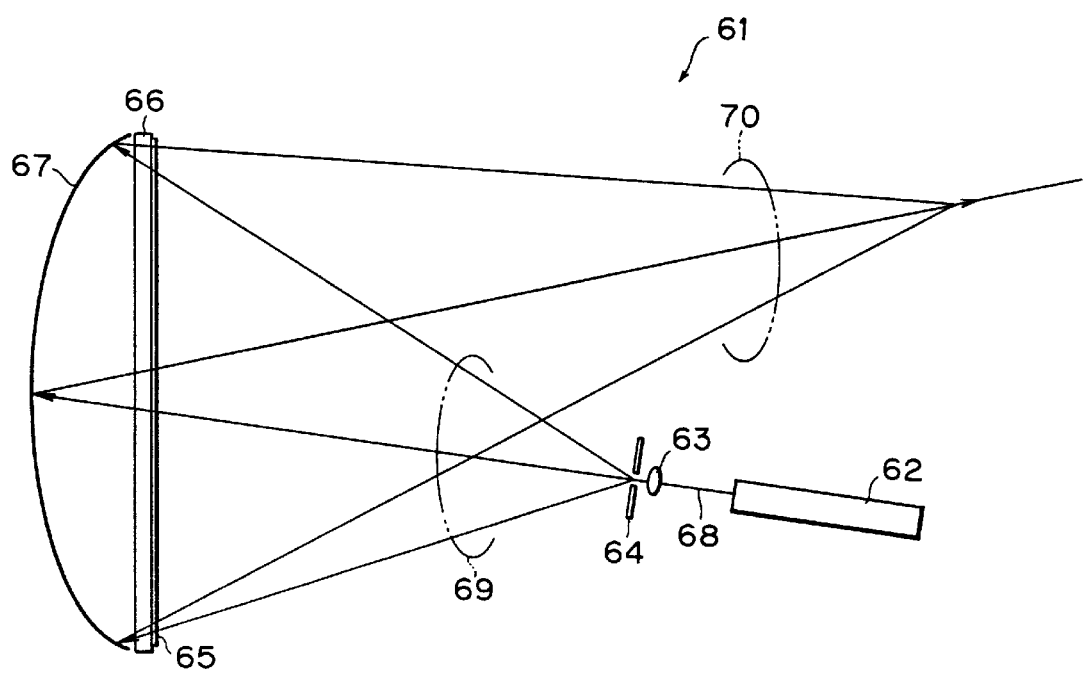
FIG. 6 shows an optical exposing system for preparing a reflection type elementary hologram composing transferring optical means used in a three-dimensional image projecting device according to the present invention.

FIG. 6 is a schematic mimic view of an optical exposing system 61 for preparing the reflection type hologram 25. The optical exposing system 61 consists mainly of a laser light source 62, an objective lens 63, a pin hole 64, hologram light-sensitive material 65, a glass substrate 66 and concave mirror 67.

The laser light source 62 emits laser light having the same wavelength as that of the laser light emitted by the laser light source 42 used in the three-dimensional display 41. The concave mirror 67 may be the same as that used in the first embodiment. Silver-salt material or photopolymer can be used as light-sensitive material 65 for recording the hologram.

The exposing process will be explained as follows:

Laser light 68 from the laser light source 62 passes through the objective lens 63 and a pin hole 64 and appears therefrom as diverging light 69 which falls onto the hologram light-sensitive material 65 bonded to the glass substrate 66. The laser light 69 transmitted through the hologram light-sensitive material 65 and the glass substrate 66 is further reflected back by the concave mirror 67, whereby the light becomes converging light 70. In the hologram light-sensitive material 65, the diverging light 69 and the converging light 70 form an interference pattern that is recorded therein. Namely, a volume type hologram is prepared and used as the reflection type hologram 25 functioning as optical transferring means.

A method for preparing reflection type projecting hologram lenses 28 and 28' used in the three-dimensional image display 21 shown in FIGS. 4A and 4B is now described as follows:

The reflection type projecting hologram lenses 28 and 28' are holograms functioning as the reflection type projecting lenses 8 and 8' used in the first embodiment.

Figure 7:
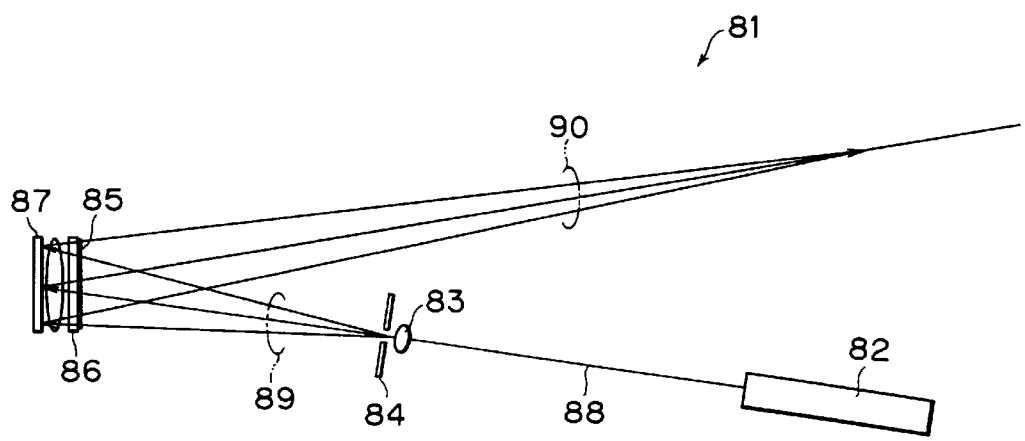
FIG. 7 shows an optical exposing system for preparing a reflecting type projecting hologram lenses used in a three-dimensional image projecting device according to the present invention.

FIG. 7 is a schematic mimic view of an optical exposing system 81 for preparing the reflection type projecting hologram lens. The optical exposing system 81 consists mainly of a laser light source 82, an objective lens 83, a pin hole 84, hologram light-sensitive material 85, a glass substrate 86 and reflection type projecting lens 87.

The laser light source 82 emits laser light having the same wavelength as that of the laser light emitted by the laser light source 42 used in the three-dimensional display 41. The reflection type projecting lens 87 may be the same as the reflection type projecting lenses 8 and 8' used in the first embodiment.

The exposing process is as follows:

Laser light 88 emitted from the laser light source 82 passes through the objective lens 83 and a pin hole 84 and appears therefrom as diverging light 89 which falls onto the light-sensitive material 85 bonded to the glass substrate 86. The laser light 89 transmitted through the light-sensitive material 85 and the glass substrate 86 is reflected by the reflection type projecting lens 87, whereby the light becomes converging light 90. In the light-sensitive material 85, the diverging light 89 and the converging light 90 form an interference pattern which is recorded therein. Namely, a volume hologram is thus prepared and used as the reflection type projecting hologram lenses 28 and 28'.

Although the second embodiment uses the laser light source 42 of the three-dimensional image display 41, it can also apply a white light source in place of the laser light source. However, the use of the white-light source instead of the laser light source in the second embodiment comprising the reflection type projecting hologram lenses 28, 28' and reflection type hologram 25 (optical transferring means) may cause such a problem that an image may be fuzzy depending upon a space into which a three-dimensional image is projected. Accordingly, the white-light source can be applied on such a condition that the space into which a three-dimensional image is projected is restricted not to make the image be fuzzy.

In the second embodiment, there are used the reflection type hologram lenses 28 and 28' and reflection type hologram 25 functioning as optical transferring means, either of which can also be replaced by the refection type projecting lenses 8 and 8' or the optical transferring means (concave mirror) 5, which is used in the first embodiment. In this case, it is also possible to use a white-light source or laser light source. However, the use of the white-light source in the thus modified second embodiment is restricted to the condition that the space into which a three-dimensional image is projected may not cause the image to be fuzzy.

The above-described embodiments also have the following possible variations:

The second embodiment uses one laser-light source (single wavelength) that can represent a three-dimensional image in monochrome. This embodiment can display colored three-dimensional images if it is provided with three laser-light sources of red, green and blue light respectively, a reflection type hologram (optical transferring means) and reflection type hologram lenses, which have been prepared from holographic material being sensitive to red, blue and green laser beams.

The first and second embodiments can provide three-dimensional video by using, instead of the still object 2 or the three-dimensional image 22, a large number of holograms continuously taken from an object, which can be represented according to a given time sequence on the same principle as movies.

In the first embodiment, the object 2 is disposed between the optical transferring means 5 and the optical projecting system 4 to project three-dimensional images 9 and 9' in an enlarged size than the object 2. It is, therefore, possible to project a three-dimensional image in a reduced size by disposing the object 2 farther than the optical transferring means 5 from the projecting optical system 4.

In the second embodiment, it is also possible to project a three-dimensional image 22 in a reduced size by disposing the three-dimensional image 22 beyond the reflection type hologram (optical transferring means) 25 from the optical projecting system 24.

As described above, the three-dimensional image projecting device according to the present invention can provide a three-dimensional image observable from a wide visual field, which allows an observer to see by using own mechanism of stereoscopic vision such as eyefocus adjusting function besides parallax. Namely, the observer can enjoy the stereoscopic vision presented by the projecting device for relatively long time without so tiring his or her eyes.

The three-dimensional image projecting device according to the present invention offers following advantages:

(1) A three-dimensional image display according to the present invention is capable of producing three-dimensional image observable in a wide visual field even with not-expensive projection lenses having not-so-wide angle since it is so constructed that a plurality of three-dimensional images can be projected at the same magnification in the same plane to form a continuous area where the images join with each other. The device provides a three-dimensional image having the same information as a three-dimensional object has, which image one can observe by using own mechanism of stereoscopic vision such as eye focus adjusting function besides parallax. Namely, one can observe stereo-images for a relatively long time without so tiring his or her eyes.

(2) A three-dimensional image display device has the same features as described in (1) above and is further characterized in that a three-dimensional image is produced by using an object and illuminating means, i.e., a stereoscopic image of the existing body can be observed.

(3) A three-dimensional image display device has the same features as described in (1) above and is further characterized in that three-dimensional image-light generating means is a three-dimensional image displaying means which enables observation of a three-dimensional image reproduced from data of an actual three-dimensional body, which is stored in a computer, or from data of a three-dimensional image formed by a computer. Three-dimensional video can be also observed by rewriting data of three-dimensional images displayed on the three-dimensional display means into time-series data on the same principle as TV pictures.

(4) A three-dimensional image display device has the same features as described in (3) above and is further characterized in that the three-dimensional image displaying means is provided with a hologram previously taken from an object, whereby a three-dimensional image of the object being absent therein can be observed. This means that the device can be further miniaturized. It is also possible to observe three-dimensional video by changing-over a large number of holograms according to a time sequence on the same principle as the movies.

(5) A three-dimensional image display device has the same features as described in (3) above and is further characterized in that the three-dimensional image displaying means displays a three-dimensional image by subsequently displaying a plurality of sectional images composing a three-dimensional image with displacing two-dimensional image displaying means. This makes it possible to observe a three-dimensional image reproduced from data of an actual three-dimensional body, which is stored in a computer, or from data of a three-dimensional image formed by a computer.

(6) A three-dimensional image display device has the same features as described in any one of (1) to (5) above and is further characterized in that the reflection type projecting lenses are diffraction type optical elements (represented by holograms), which can be disposed in a plane, assuring easy arrangement a large number of miniaturized elements. Namely, respective projecting lenses are jointed to each other or arranged with partial overlaps to obtain a wide continuous visual field.

(7) A three-dimensional image display device has the same features as described in any one of (1) to (6) above and is further characterized in that the optical transferring means is a concave mirror which can create a high-quality three-dimensional color image being free from wavelength-dependent characteristic and having a very small aberration.

(8) A three-dimensional image display device has the same features as described in any one of (1) to (6) above and is further characterized in that the optical transferring means is a diffraction type optical element (represented by a hologram), which can be prepared even in a large size at a low cost (by copying). A multilayer-recorded hologram assures a wider visual field.

I claim:

1. A three-dimensional image projecting device comprising light-generating means for generating light participating in forming an optical image of a three-dimensional object;

optical projecting means for projecting an optical image formed by light generated by the light-generating means;

optical transferring means for directing the optical image from the optical projecting means to respective visual fields, the optical projecting means being composed of a plurality of reflection type projecting lenses; and wherein respective three-dimensional optical images are projected and formed at the same multiplication in the same space by the plurality of reflection type projecting lenses so that respective image-forming areas are continued to each other.

2. A three-dimensional image projecting device as defined in claim 1, wherein the light-generating means includes a illuminating means for illuminating the three-dimensional object.

3. A three-dimensional image projecting device as defined in claim 1, wherein the light-generating means is three-dimensional image display means.

4. A three-dimensional image projecting device as defined in claim 3, wherein the three-dimensional image display means includes holograms for reproducing the three-dimensional image.

5. A three-dimensional image projecting device as defined in claim 3, wherein the three-dimensional image display means is a device that moves two-dimensional display means and sequentially displays a plurality of sectional images composing a three-dimensional image correspondingly to the displacement of the two-dimensional image display means.

6. A three-dimensional image projecting device as defined in any one of claims 1 to 5, wherein at least one of the plurality of reflection type projecting lenses is a diffraction type optical element.

7. A three-dimensional image projecting device as defined in any one of claims 1 to 5, wherein the optical transferring means is a concave mirror.

8. A three-dimensional image projecting device as defined in any one of claims 1 to 5, wherein the optical transferring means is a diffraction type optical element.

* * * * *